(12) United States Patent
Morita et al.

(10) Patent No.: US 6,845,908 B2
(45) Date of Patent: Jan. 25, 2005

(54) STORAGE CARD WITH INTEGRAL FILE SYSTEM, ACCESS CONTROL AND CRYPTOGRAPHIC SUPPORT

(75) Inventors: Toshiyasu Morita, Redwood City, CA (US); Shumpei Kawasaki, Los Altos Hills, CA (US)

(73) Assignee: Hitachi Semiconductor (America) Inc., San Jose, CA (US)

( * ) Notice: Subject to any disclaimer, the term of this patent is extended or adjusted under 35 U.S.C. 154(b) by 93 days.

(21) Appl. No.: 10/101,387

(22) Filed: Mar. 18, 2002

(65) Prior Publication Data

US 2003/0173400 A1 Sep. 18, 2003

(51) Int. Cl.[7] .................................................. G06K 5/00
(52) U.S. Cl. ....................................... 235/382; 380/255
(58) Field of Search ................................ 235/380, 379, 235/382, 492; 705/64, 67, 70, 72, 51; 380/255, 259, 277; 189/189; 713/189

(56) References Cited

U.S. PATENT DOCUMENTS

| | | |
|---|---|---|
| 4,985,920 A | 1/1991 | Seki |
| 5,293,424 A | 3/1994 | Holtey et al. |
| 5,357,573 A | 10/1994 | Walters |
| 5,428,685 A | 6/1995 | Kadooka et al. |
| 5,448,045 A | 9/1995 | Clark |
| 5,563,948 A | 10/1996 | Diehl et al. |
| 5,574,859 A | 11/1996 | Yeh |
| 5,623,552 A * | 4/1997 | Lane ........................... 382/124 |
| 5,666,495 A | 9/1997 | Yeh |
| 5,677,952 A * | 10/1997 | Blakley et al. .............. 713/189 |
| 5,699,549 A | 12/1997 | Cho |
| 5,929,428 A | 7/1999 | Iijima |
| 5,999,622 A * | 12/1999 | Yasukawa et al. ............. 705/51 |
| 6,006,297 A | 12/1999 | Le Roux |
| 6,031,910 A | 2/2000 | Deindl et al. |
| 6,199,128 B1 | 3/2001 | Sarat |
| 6,296,191 B1 | 10/2001 | Hamann |
| 6,378,071 B1 * | 4/2002 | Sasaki et al. ................ 713/165 |
| 2001/0021976 A1 | 9/2001 | Shibuya et al. |
| 2002/0166053 A1 * | 11/2002 | Wilson ........................ 713/189 |

OTHER PUBLICATIONS

Sakazume, Hideaki; "Hitachi's Semiconductor" (book); 3 pages including English translation of p. 58; ISBN4–931466–30–3.

* cited by examiner

Primary Examiner—Diane I. Lee
(74) Attorney, Agent, or Firm—Squire, Sanders & Dempsey, L.L.P.

(57) ABSTRACT

A storage card includes non-volatile memory; an authentication engine capable to authenticate a password and transmit authorization to read from and write to files; a file system, coupled to the authentication engine, capable to receive file commands from a computer, receive authorization from the authentication engine, and to transmit file instructions; and a sector driver, coupled to the file system and the memory, capable to read from and write to the memory in response to the instructions received from the file system.

29 Claims, 5 Drawing Sheets

STORAGE CARD WITH INTEGRAL FILE SYSTEM, ACCESS CONTROL AND CRYPTOGRAPHIC SUPPORT

TECHNICAL FIELD

This invention relates generally to multimedia cards, and more particularly, but not exclusively, provides a portable storage card having an integral file system, access control, and cryptographic support.

BACKGROUND

Conventional handheld computing devices are becoming more popular. They were initially used primarily for note taking and as appointment reminders, but they are gradually becoming more versatile.

The conventional handheld computing devices typically have limited amounts of storage capacity, so many of them now support removable media in the form of multimedia cards and memory sticks®. For example, the Sony CLIE™ uses removable memory sticks® ranging in size from 8 MB up to 128 MB.

With the introduction of these removable media types, it becomes possible for the end user to store large amounts of data. Some of this data may be of a confidential nature and/or include copyrighted material, and the end user may wish to restrict access to this data to a specific authorized user or class of users. The current generation of secure media attempts to address this problem by requiring authentication by the user. However, these secure media devices implement a type of security where the file is visible in an encrypted form even without authentication. This is undesirable because the encrypted data might still be decrypted using a brute-force "try all permutations" type approach. Further, encrypted keys or passwords needed to decrypt the encrypted data may also be visible without authentication and therefore subject to decryption without user authentication.

Figure 1:
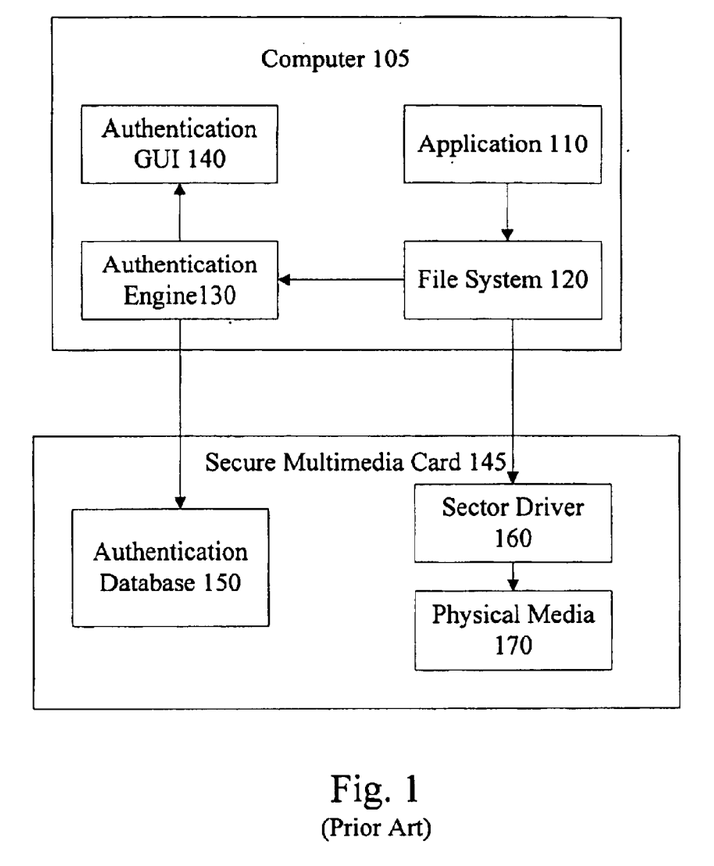
FIG. 1 is a block diagram illustrating a secure multimedia card coupled to a computing device.

For example, referring to FIG. 1, a block diagram illustrating an embodiment of a conventional handheld computer device 105 communicatively coupled to a conventional removable secure media card 145 is shown. The computer device 105 includes an application 110, file system 120, authentication engine 130, and an authentication graphical user interface 140 (GUI), which all reside in memory (not shown) of the computer device 105. The card 145 includes an authentication database 150, sector driver 160, and physical media 170.

The secure media card 145 protects data by keeping the authentication database 150 on the card 145 and by encrypting the database 150. This design protects the authentication database 150 by preventing authentication codes and encrypted passwords in database 150 from being compromised. However, the secure media card 145 itself is accessed by sectors, and does not know which sectors belong to protected and unprotected files, so it cannot perform access checks at the sector level. Therefore, the raw encrypted data is accessible at the sector level.

SUMMARY

The present invention provides a crypto-media card having an integral file system, access control, and cryptographic support. This new card solves the problem of access to raw encrypted data by providing a device that responds to file access commands instead of sector access commands. With this implementation, it is not possible to access the encrypted data unless a user has been authenticated. In fact, it is possible to even hide the existence of the encrypted data on the card if desired.

The card comprises an authentication engine and database, a file system, a sector driver, and an encryption engine. The authentication engine and database authenticates users, thereby enabling to access the file system, which reads and writes from and to memory on the card. The encryption system enables encryption and decryption of data on the card. A computing device that is communicatively coupled to the card issues file access commands directly to the removable card. The authentication engine and database can accept or reject access to protected data dependent on whether or not the user has performed authentication with the card. Further, the card does not allow sector level access, thereby preventing access to encrypted data.

In an alternative embodiment of the invention, the card includes a biometric reader, such as a fingerprint reader, voice analyzer, or retina scanner, that is integral to card and is used to gain access to data on the card.

The present invention further provides methods for storing and accessing data. In contrast to conventional removable storage media, both methods are performed within the storage card, thereby preventing sector level access to data stored on the card. The storing method comprises: receiving a write request, requesting a password (and/or other authentication data, such as biometric data); receiving and validating the password; and encrypting and storing the data if the password is valid. The accessing method comprises: receiving a read request; requesting a password (and/or other authentication data, such as biometric data); receiving a password and validating the password; retrieving a decryption key and decrypting the read-requested data using the key.

The card and methods therefore advantageously prevents unauthorized sector level access to data stored on the card.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person skilled in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

The present invention provides a crypto-media card that only responds to file access commands instead of to sector access commands. An advantage of the crypto-media card over conventional removable storage cards is that the crypto-media card prevents reading of raw data on the card without authentication. Further, the crypto-media card stores authentication codes on the crypto-media card instead of on a computer. Storing the authentication codes locally is superior because otherwise the authentication codes are extremely vulnerable because they reside on the computing device and can be relatively easily read. Typically, it is easy to load new programs onto this computing device, and these new programs can be used to subvert the authentication. When the authentication code is on the removable storage device, the authentication code is protected from malicious programs that can be loaded on the computing device.

In addition, to prevent unauthorized access to data on the crypto-media card, the card can be made physically tamper-proof in many different ways, including encasing the crypto-media card in epoxy so that tampering with the device will destroy the device. Alternatively, crypto-media card can be made from a single chip. This considerably complicates the process of intercepting the signal between different components extremely difficult, since it necessitates use of an advanced microscope, such as a scanning tunneling microscope, to view the signal paths.

A further advantage of the crypto-media card is that it prevents decryption key interception since the decryption key is stored on the crypto-media card and not on a computer and is never transmitted external to the crypto-media card.

Figure 2:
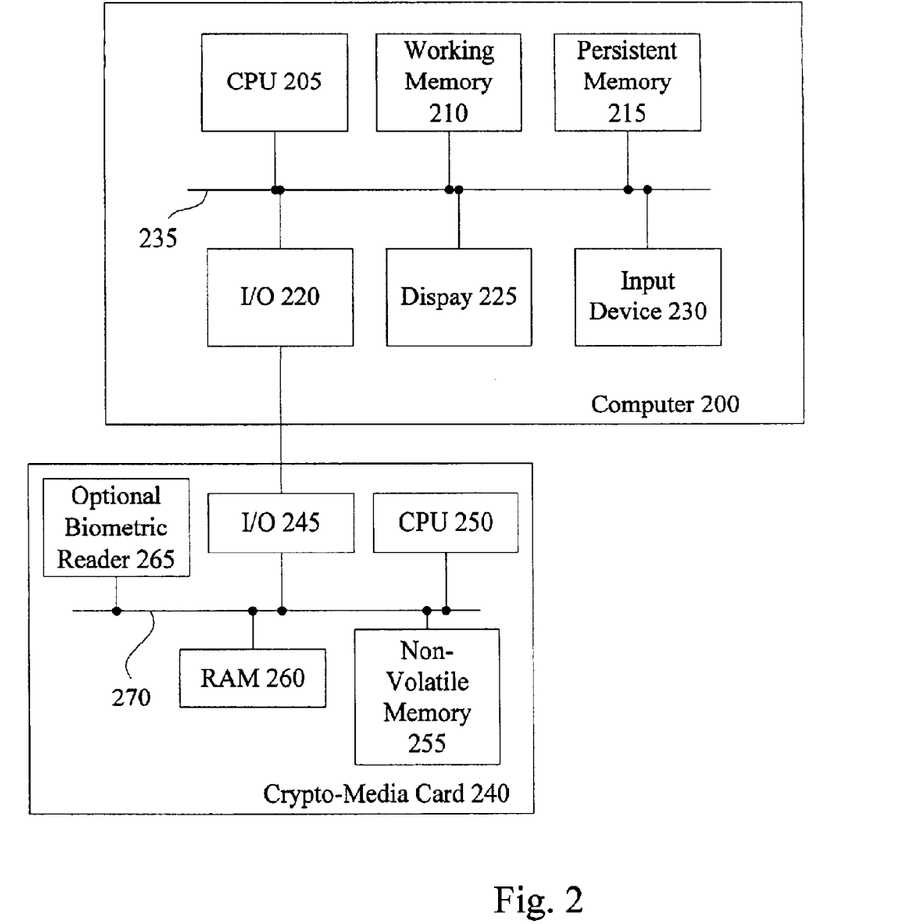
FIG. 2 is a block diagram illustrating a crypto-media card coupled to a computer according to an embodiment of the invention.

FIG. 2 is a block diagram illustrating a crypto-media card 240 communicatively coupled to a computer 200 according to an embodiment of the invention. The term computer as used herein refers generically to a computing device and may include, for example, a desktop computer, a laptop computer, a personal digital assistant, etc. The computer 200 includes a central processing unit (CPU) 205; working memory 210; persistent memory 215; input/output (I/O) interface 220; display 225 and input device 230, all communicatively coupled to each other via system bus 235. CPU 205 includes a processor capable to execute software stored in persistent memory 215. Working memory 210 may include random access memory (RAM) or any other type of read/write memory devices or combination of memory devices. Persistent memory 215 may include a hard drive, read only memory (ROM) or any other type of memory device or combination of memory devices that can retain data after example computer 200 is shut off. I/O interface 220 is communicatively coupled, via wired or wireless techniques, crypto-media card 240, thereby enabling communications between example computer 200 and the crypto-media card 240.

Display 225 may include a liquid crystal display or other display device. Input device 230 may include a keyboard, mouse, or other device for inputting data, or a combination of devices for inputting data.

One skilled in the art will recognize that the example computer 200 may also include additional devices, such as network connections, additional memory, additional processors, LANs, input/output lines for transferring information across a hardware channel, the Internet or an intranet, etc. One skilled in the art will also recognize that the programs and data may be received by and stored in the system in alternative ways.

Crypto-media card 240 may include a memory stick or any other portable memory device that can be removeably coupled to computer 200. The card 240 comprises an I/O interface 245, a CPU 250, RAM 260 (or other working memory type) and non-volatile memory 255. The components of card 240 are all interconnected together for communication via bus 270. In addition, card 240 may also comprise a biometric reader 265 coupled to bus 270. I/O 245 enables communication with computer 200. CPU 205 processes instructions stored in non-volatile memory 255. Biometric reader 265 is a device for read biometric data, such as a fingerprint scanner, retina scanner, or voiceprint analyzer.

Figure 3:
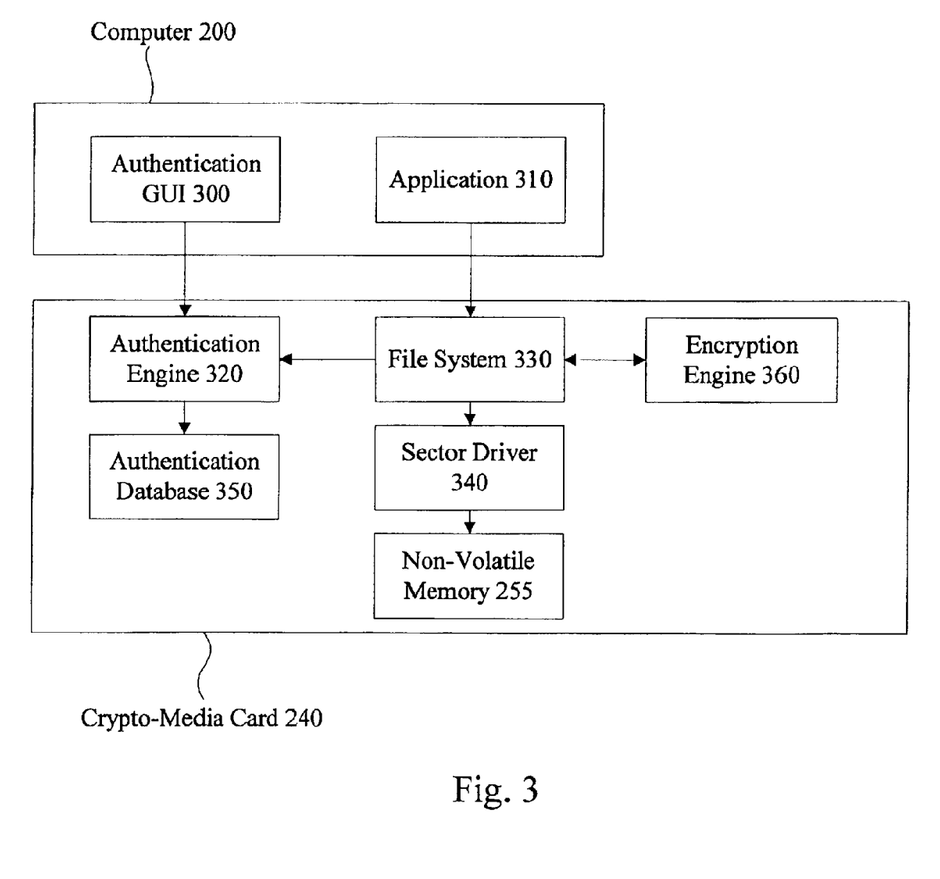
FIG. 3 is a block diagram illustrating software components of the crypto-media card of FIG. 2.

FIG. 3 is a block diagram illustrating software components of the crypto-media card 240 (FIG. 2) and computer 200 (FIG. 2). The computer 200 includes an authentication graphical user interface (GUI) 300 and an application 310. The card 240 includes an authentication engine 320, authentication database 350, file system 330, encryption engine 360, and sector driver 340.

Application 310 sends file read and write commands to file system 330, which only responds to the commands upon receiving authorization from authentication engine 320. Authentication GUI 300 prompts a user for a password and sends it to authentication engine 320 to authenticate the password using data from database 350. GUI 300 may also encrypt the password before sending it to authentication engine 320. In an alternative embodiment of the invention, biometric reader 265, which is integral with card 240, may prompt a user for biometric data for authentication by engine 320. Once authentication engine 320 authenticates the password or biometric data, engine 320 gives authorization to file system 330 to read and/or write from and/or to non-volatile memory 255 via sector driver 340. In addition, encryption engine 360 may encrypt data before file system 330 stores the data in memory 255. If the data is encrypted, file system 330 will also store a decryption key in memory 255. The decryption key may be identical to the encryption key in cases where symmetric encryption is used. If asymmetric encryption is used, the decryption key will be different from the encryption key. During a data read operation, encryption engine 360 will decrypt the data using the decryption key stored in memory 255.

As the file system 330 and sector driver 340 are located in card 240 instead of in computer 200, hackers cannot gain access to raw encrypted data stored in memory 255. Further, as decryption keys are stored in memory 255 and are never transmitted outside of card 240, the decryptions keys cannot be intercepted. When a biometric reader 265, which is integrated into card 240, is used in place of authentication GUI 300 for entering authentication data, the authentication data is never transmitted outside of card 240 and therefore cannot be intercepted. In an embodiment of the invention, biometric reader 265 and authentication GUI 300 may be used concurrently so as to accept to sets of authentication data.

In an embodiment of the invention, the authentication engine 320 enforces a minimum password length when authentication GUI 300 is used. For example, authentication engine 320 may require a minimum password length of six characters with at least one number, wherein two adjacent characters are not identical. This limitation provides a password space of at least 1.8 billion passwords, making it extremely time consuming to crack the password if an authentication delay is used between authentication attempts. An authentication delay of just one second would require about 59.9 years to search the entire password space, thereby making it extremely time consuming to crack a password using a brute force method.

Wherein the card 240 is mass duplicated with identical data and passwords, it may be necessary to increase the password space and/or increase the authentication delay since otherwise one could hack multiple devices in parallel by searching different fractions of the password space for each copy.

File system 330 of crypto-media card 240 is robust and does not get corrupted if power is shut down suddenly. File system 330 automatically returns file system metadata and data to the last consistent state when faced with a power interruption or decoupling from computer 200. Accordingly, the file system 330 is either log-structured or journaled so that unfinished write operations may be cleanly removed from the non-volatile memory 255. However, a variable that holds an authentication flag is in volatile memory and so when the crypto-media card 240 is shut down or otherwise looses power, the flag is cleared until power is reapplied and the user is authenticated again.

Storage card 240 may also include a user API (not shown) between the application 310 and file system 330. Example code for the API follows:

```
FILE *fopen(const char *path, const char *mode);
FILE *fdopen(int fildes, const char *mode);
FILE *freopen(const char *path, const char *mode,
    FILE *stream);
int fclose(FILE *stream);
size_t fread(void *ptr, size_t size, size_t nmemb,
    FILE *stream);
size_t fwrite(const void *ptr, size_t size, size_t nmemb,
    FILE *stream);
int fflush(FILE *stream);
int feof(FILE *stream);
void rewind(FILE *stream);
int fseek(FILE *stream, long offset, int whence);
long ftell(FILE *stream);
int fsetpos(FILE *stream, fpos_t *pos);
int fgetpos(FILE *stream, fpos_t *pos);
void clrerr(FILE *stream);
int ferror(FILE *stream);
int remove(const char *filename);
int fstat(int filedes, struct stat *buf);
```

Access to the crypto-media card 240 is at the user level and is done through the standard C library functions as defined by the ANSI X3.159-1989 and IEEE Std1003.1-1988 standards. There are special extensions to support the crypto media card 240, which are documented below:

1. The fopen( ) function accepts two additional options as modes:

a. The "x" option which requires the user to authenticate before the file is opened. If a file is opened for writing with the "x" option, the following steps will be taken:
      1. Invoke a system function to create an authentication token from the user input
      2. Create the file
      3. Store the authentication token in the file attributes so it can be checked when reading When the file is opened for reading with the "x" option, the following steps will be taken:
      1. Invoke a system function to read an authentication token from the user
      2. Compare the authentication token with the authentication token stored in the file attributes
      3. If the tokens match, then the file file open succeeds.

Figure 4:
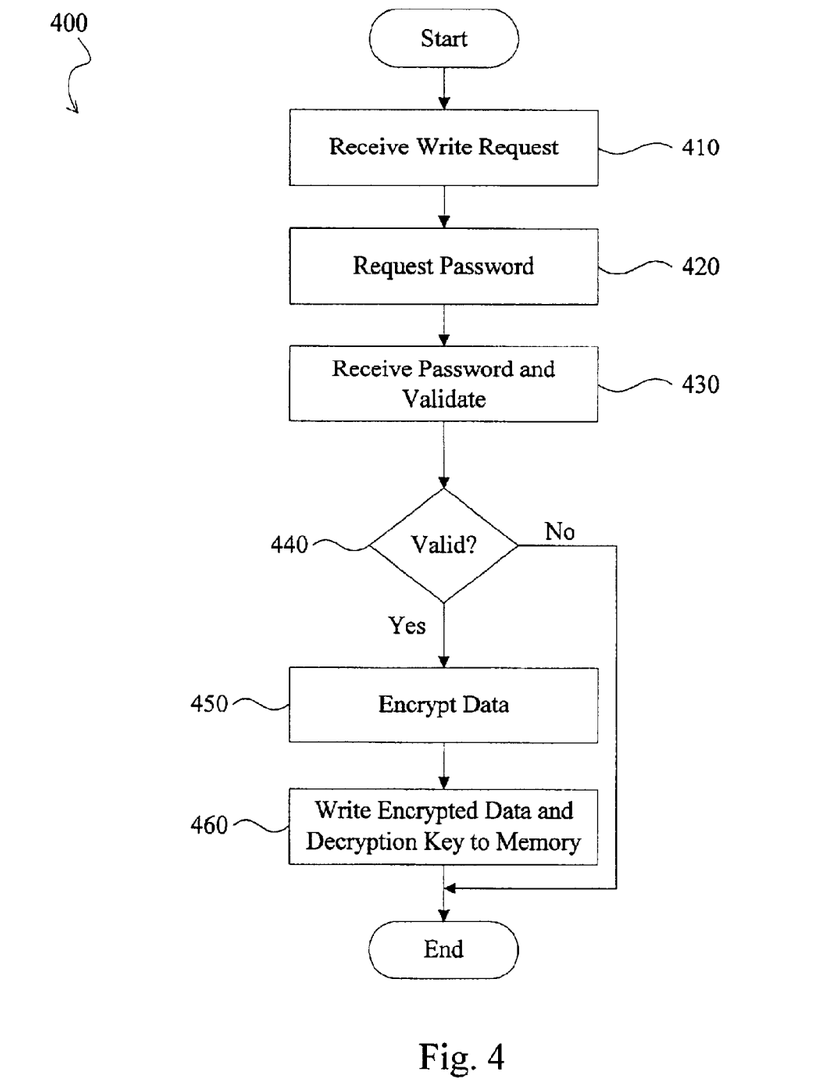
FIG. 4 is a flowchart illustrating a method for storing data on the crypto-media card of FIG. 2.

The authentication token created or compared by the system may be a simple password, based on a biometric signature (handwriting analysis, facial recognition, retinal scan, fingerprint/thumbprint analysis, etc), a time-based or some other identifier.

b. The "e" option which specifies the file should be encrypted as it is written or decrypted as it is read. When the "e" option is used when writing a file, the following steps will be taken:
      1. Generate an encryption key
      2. Invoke a system function to create an authentication token
      3. Create the file
      4. Store the encryption key in a secure database so it can be accessed with the authentication token
      5. Encrypt the file as it is written into the file When the "e" option is used when reading a file, the following steps will be taken
      1. Invoke a system function to read an authentication token
      2. Retrieve the encryption key for the file by using the authentication token
      3. Decrypt the file as it is read from the file FIG. 4 is a flowchart illustrating a method 400 for storing data on the crypto-media card 240. First, a write request is received (410). A password is then requested (420). In an alternative embodiment of method 400, a password may be sent concurrently with the write request. In another embodiment of method 400, biometric data may be used in place of or in addition to a password. The password is then received (430) and validated (430). The received password may be encrypted and therefore needs to be decrypted before validation (430). If the password is not valid, the method 400 ends and can be restarted after a time delay of, for example, one second. If the password is valid, then the data from the write request is encrypted (450) and written (460) with a decryption key to memory.

In an embodiment of the invention, encryption can be done in software on the CPU if encryption speed is not an issue since encryption algorithms generally run slowly in software. If a user stores large files, such as media files (e.g., movies, songs, etc.) then fast decryption is necessary to ensure a continuous stream of data. Accordingly, for large files it may be preferable to user hardware decryption. In another embodiment of the invention, symmetric encryption is used and therefore the decryption key is identical to the encryption key. In another embodiment, asymmetric encryption is used and therefore the decryption key is different from the encryption key. Generally, asymmetric encryption is more secure than symmetric encryption, but asymmetric encryption is slower.

In another embodiment of the invention, data need not be encrypted. Accordingly, encrypting (450) and writing (460) may not be needed and instead non-encrypted data may be written to memory. In another embodiment of the invention, repeated writes using method 400 only requires single entry of a password. In this case, requesting (420) and receiving (430) need not be repeated after the first successful write.

Figure 5:
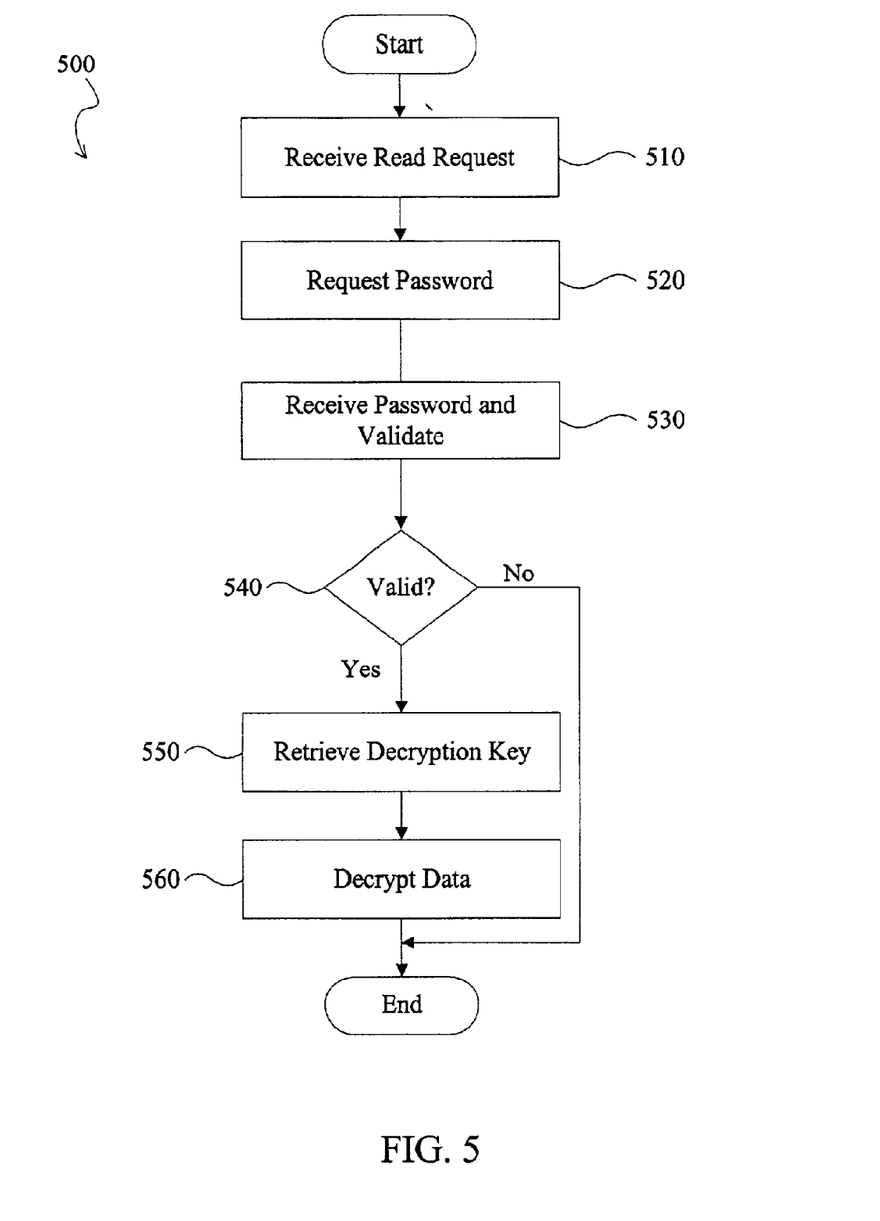
FIG. 5 is a flowchart illustrating a method of accessing data on the crypto-media card of FIG. 2.

FIG. 5 is a flowchart illustrating a method 500 for reading data on the crypto-media card 240. First, a read request is received (510). A password is then requested (520). In an alternative embodiment of method 500, a password may be sent concurrently with the read request. In another embodiment of method 500, biometric data may be used in place of or in addition to a password. The password is then received (530) and validated (530). The received password may be encrypted and therefore will need to be decrypted before validation (530). If the password is not valid, the method 500 ends and can be restarted after a time delay of, for example, one second. If the password is valid, a decryption key is retrieved (550) and the requested data is decrypted (560). The decrypted data can then be sent to computer 200 to be displayed. The method 500 then ends.

In an alternative embodiment of the invention, the data may not be encrypted and accordingly retrieving (550) and decrypting (560) are not performed. In another embodiment of the invention, repeated reads may only require entry of a password once. Accordingly, after a successful read, requesting (520) and receiving (530) need not be repeated.

The foregoing description of the illustrated embodiments of the present invention is by way of example only, and other variations and modifications of the above-described embodiments and methods are possible in light of the foregoing teaching. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A portable storage device that can be removably coupled to a computer, comprising:
   data storage;
   an authentication engine capable to authenticate a password and to transmit authorization to access the data storage;
   a file system, coupled to the authentication engine, capable to receive a file access request from the computer, to receive authorization from the authentication engine, and to control execution of the file access request.

2. The device of claim 1, further comprising an encryption engine, coupled to the file system, capable to encrypt files before storage in the data storage and to decrypt files stored in the data storage memory.

3. The device of claim 2, wherein the encryption engine uses at least one of symmetric encryption and asymmetric encryption.

4. The device of claim 1, wherein the device further comprises:
   a sector driver, coupled to the file system and the data storage, capable to access the data storage in response to the instructions received from the file system.

5. The device of claim 1, wherein the authentication engine receives a password from the computer.

6. The device of claim 5, further comprising a biometric reader integral with the device and coupled to the authentication engine, and wherein the password includes biometric data received from the biometric reader.

7. The device of claim 6, wherein the biometric reader includes a fingerprint scanner.

8. The device of claim 1, further comprising a single input/output interface for temporarily communicatively coupling the device to the computer and wherein the authentication engine and file system both communicate with the computer via the single interface.

9. The device of claim 1, wherein the device is tamper proofed.

10. A method implemented in a portable storage device, comprising:
    receiving a write request by a file system in the portable storage device from a computer, the write request including data;
    receiving a password;
    authenticating the password;
    encrypting the data if the password is authenticated; and
    using the file system to write the encrypted data and a decryption key to data storage within the portable storage device if the password is authenticated.

11. The method of claim 10, wherein the encrypting uses a symmetric encryption algorithm.

12. The method of claim 10, wherein the encrypting uses an asymmetric encryption algorithm.

13. The method of claim 10, wherein the password is received from a computer.

14. The method of claim 10, wherein the password includes biometric data from a biometric reader that is integral with the portable storage device.

15. The method of claim 14, wherein the biometric data includes a fingerprint.

16. A method implemented in a portable storage device, comprising:
    receiving a read request from a computer by a file system in the portable storage device;
    receiving a password; and
    authenticating the password;
    using the file system to access data storage in the portable storage device to obtain an encrypted file associated with the read request from the data storage, if the password is authenticated;
    decrypting the encrypted file associated with the read request if the password is authenticated; and
    transmitting the decrypted file to the computer if the password is authenticated.

17. The method of claim 16, wherein the password is received from a computer.

18. The method of claim 16, wherein the password includes biometric data from a biometric reader that is integral with the portable storage device.

19. The method of claim 18, wherein the biometric data includes a fingerprint.

20. A portable storage apparatus capable of being removably coupled to a computer, comprising:
    data storage for storing data, the data storage having a directory area; a file name analyzer capable to receive a file name from the computer and to obtain data storage location information corresponding to the file name from the directory area in the data storage; and
    a sector driver, coupled to the file name analyzer, capable to receive the location information from the file name analyzer and to retrieve data corresponding to the data storage location information from the data storage.

21. The apparatus of claim 20, further comprising an encryption engine, coupled to the sector driver, capable to decrypt files in the data storage.

22. The apparatus of claim 20, wherein the sector driver is further capable to write to the data storage.

23. The apparatus of claim 20, wherein the device is tamper proofed.

24. The apparatus of claim 20, further comprising an authentication engine, coupled to the file name analyzer, capable to receive and authenticate a password and wherein the sector driver is capable to get data only after password authentication.

25. A method implemented in a portable storage device, comprising:

receiving a read request from a computer by a file system in the portable storage device;

receiving a password;

authenticating the password; and using the file system to transmit a file associated with the read request from data storage within the portable storage device to the computer if the password is authenticated.

26. The method of claim 25, wherein the password is received from a computer.

27. The method of claim 25, wherein the password includes biometric data from a biometric reader that is integral with the portable storage device.

28. The method of claim 25, wherein the biometric data includes a fingerprint.

29. The method of claim 25, further comprising decrypting the file before transmitting the file if the password is authenticated.

* * * * *